(12) United States Patent
Martens

(10) Patent No.: US 6,200,223 B1
(45) Date of Patent: Mar. 13, 2001

(54) FLEXIBLE SHAFT COUPLING FOR A POWER TRANSMISSION SYSTEM DRIVEN BY A CENTRAL DRIVE UNIT, ESPECIALLY IN AIRCRAFT

(75) Inventor: Wilhelm Martens, Delmenhorst (DE)

(73) Assignee: DaimlerChrysler Aerospace Airbus GbmH, Hamburg (DE)

( * ) Notice: Subject to any disclaimer, the term of this patent is extended or adjusted under 35 U.S.C. 154(b) by 0 days.

(21) Appl. No.: 09/095,444

(22) Filed: Jun. 10, 1998

(30) Foreign Application Priority Data

Jun. 12, 1997 (DE) .............................. 197 24 772

(51) Int. Cl.⁷ ....................................... F16D 3/52
(52) U.S. Cl. ..................... 464/99; 244/215; 403/220; 403/337
(58) Field of Search ................... 403/220, 335, 403/337; 464/69, 72, 98, 99, 147, 106; 244/215

(56) References Cited

U.S. PATENT DOCUMENTS

| | | | |
|---|---|---|---|
| 1,947,052 | * | 2/1934 | Lack ........................................ 464/99 |
| 3,494,147 | * | 2/1970 | Goody ................................ 464/69 X |
| 3,594,851 | * | 7/1971 | Swatton ........................... 244/215 X |
| 4,225,264 | * | 9/1980 | Coone .................................. 403/337 |
| 4,708,692 | * | 11/1987 | Weiss .................................... 464/69 |
| 4,715,567 | * | 12/1987 | Poccard ........................... 244/215 X |
| 4,795,012 | * | 1/1989 | Durum .................................. 464/99 |
| 4,892,274 | * | 1/1990 | Pohl et al. ...................... 244/215 X |
| 5,019,015 | * | 5/1991 | Wasserfuhr ............................ 464/99 |
| 5,888,140 | * | 3/1999 | Klingler et al. ....................... 464/99 |

FOREIGN PATENT DOCUMENTS

| | | |
|---|---|---|
| 664478 | 8/1938 | (DE) . |
| 3217806 | 5/1983 | (DE) . |
| 763258 | * 12/1956 | (GB) ..................................... 464/99 |

* cited by examiner

Primary Examiner—Lynne H. Browne
Assistant Examiner—Greg Binda
(74) Attorney, Agent, or Firm—W. F. Fasse; W. G. Fasse

(57) ABSTRACT

A flexible coupling for flexibly connecting two rotary drive shafts includes a first coupling flange connected to the first shaft, a second coupling flange connected to the second shaft, a flexible disk arranged between the two coupling flanges, and four connector bolts that respectively connect the two flanges to the flexible disk. A first pair of the bolts is securely connected to the first flange and to the flexible disk, while passing with free play through a clearance hole in the second flange. A second pair of the bolts is securely connected to the second flange and to the flexible disk, while passing with free play through a clearance hole in the first flange. In ordinary operation, the connection and force transmission between the coupling flanges is carried out through the flexible disk. If the flexible disk or one or more of the connector bolts fails, then the connection and force transmission between the two coupling flanges will be carried out directly through the connector bolts in a fail-safe operating mode. The flexible coupling is especially adapted for use in a transmission system for transmitting drive power from a central drive unit to the high lift flaps and slats of an aircraft.

18 Claims, 4 Drawing Sheets

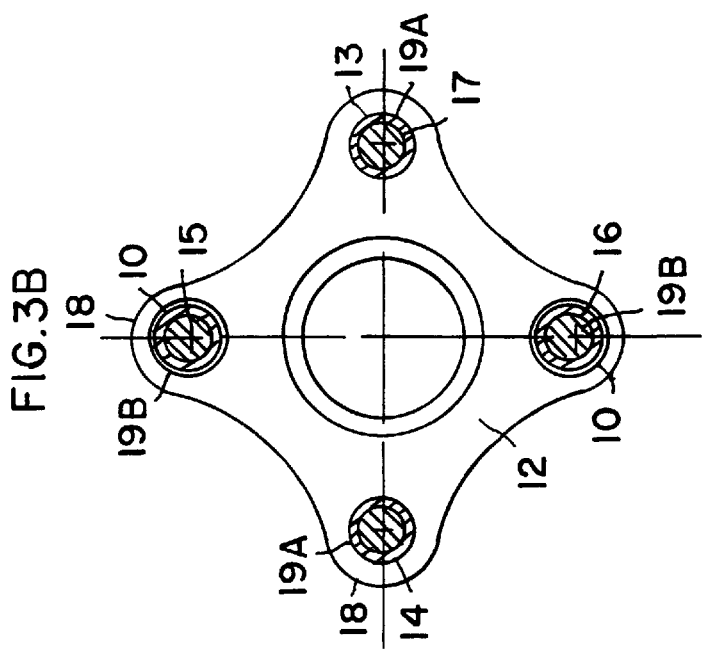
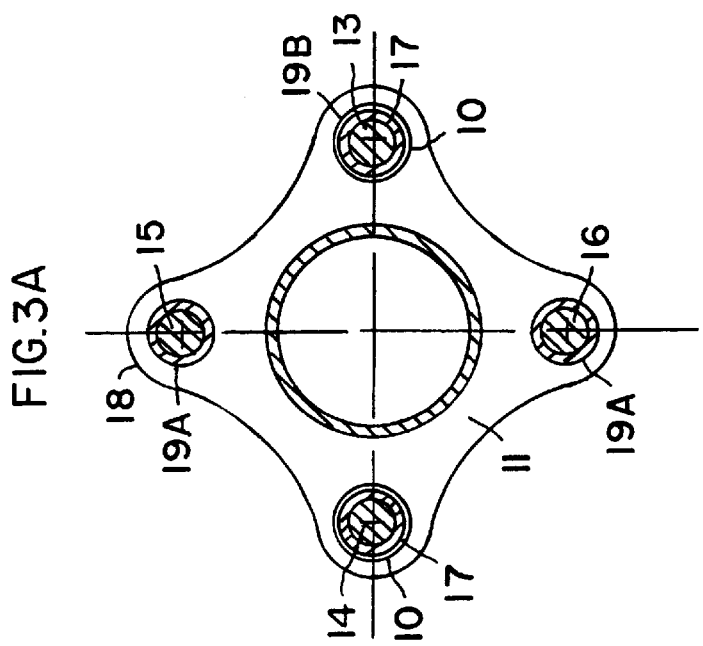

FLEXIBLE SHAFT COUPLING FOR A POWER TRANSMISSION SYSTEM DRIVEN BY A CENTRAL DRIVE UNIT, ESPECIALLY IN AIRCRAFT

PRIORITY CLAIM

This application is based on and claims the priority under 35 U.S.C. §119 of German Patent Application 197 24 772.5-12, filed on Jun. 12, 1997.

FIELD OF THE INVENTION

The invention relates to a flexible coupling for connecting two rotary drive shafts, especially in a transmission system that is driven by a central drive unit in an aircraft.

BACKGROUND INFORMATION

It is generally known and typical in the construction and operation of aircraft, that the high lift landing flaps and slats arranged on the wings are driven by means of a transmission system from a centrally arranged drive unit. In this manner, the drive power of a single drive unit can be used to operate a plurality of flaps and slats or the like, without requiring a plurality of separate drive motors. In this context, the overall drive system comprises a drive motor, redirecting or transfer transmissions, actuators, and plural transmissions shafts, as well as support bearings, articulated joints, and shaft couplings associated with the shafts.

FIG. 1 schematically shows a general overview of a known arrangement of a drive system for driving the flaps 51 and slats 52 arranged in a wing 5 of an aircraft 50. The flap and slat drive system includes a transmission system 1 that is driven or powered by a central drive unit 25. The transmission system 1 includes transmission shafts 8 respectively coupled together by coupling elements 2 at locations where the shaft run is substantially straight, and by articulated joint elements 4 at locations where the shaft run passes through a bend or the like. Additionally, respective coupling elements 2, which may also provide a limited flexibility, and the articulated joint elements 4 must respectively be arranged at each location where the transmission system 1 is supported by support bearings 3 or connected to redirecting or transfer transmissions 26 or to actuators 27. In this context, the particular type of coupling element or joint element is selected depending on the magnitude of the bend or redirection of the shaft line at that location. It is necessary to provide a flexible joint at each support bearing, in order to avoid the introduction of external bending forces into the shafts due to the flexing of the wing 5.

Although flexible shaft couplings in general are known in the art, there has been a continuing need for improving the safety, reliability, and simplicity, and reducing the size and weight of such couplings, while achieving a more robust arrangement with a reduced need for maintenance, which may be used uniformly for many different installation situations throughout the transmission system.

OBJECTS OF THE INVENTION

In view of the above it is an object of the invention to provide an improved flexible shaft coupling that is relatively simple, cost economical, and failure tolerant relative to prior art shaft couplings, while fulfilling all strength and safety standards applicable to the construction and operation of aircraft. The invention further aims to provide a flexible coupling that has a fail-safe operation mode, whereby the coupling will still achieve its flexible coupling functions even in the event of a failure of one of the connecting bolts or of the flexible disk of the coupling. The invention further aims to overcome or avoid the other disadvantages of the prior art, and to achieve additional advantages, as apparent from the present description.

SUMMARY OF THE INVENTION

The above objects have been achieved in a flexible coupling for drive shafts according to the invention, comprising first and second coupling flanges respectively connected to the ends of two shafts that are to be connected, and a flexible disk arranged and interconnected between the two coupling flanges by means of bolts and bushings, in such a manner that the two shafts are flexibly joined together. Particularly according to the invention, each of the bolt connections is respectively embodied to be securely fastened to a respective one of the coupling flanges while allowing free play relative to the other one of the coupling flanges.

Namely, at least one first bolt is secured to a first flange and has play relative to a second flange, while at least one second bolt is secured to a second flange and has play relative to the first flange. Bushings are arranged on the bolt, between the flanges and the flexible disk, so that each bolt securely clampingly holds the flexible disk and respectively connects the flexible disk securely to one or the other of the coupling flanges. In this manner, the force or torque transmission in normal operation is from the first coupling flange, through the first bolt(s) secured to the first flange, from there into the flexible disk, from the flexible disk into and through the second bolt(s) secured to the second coupling flange, and from there to the second coupling flange, or entirely vice versa.

The first and second coupling flanges may be respective rigid plates. Nonetheless, the overall coupling joint is flexible to a defined degree, due to the flexibility of the flexible disk through which the rigid flanges are interconnected and the power is transmitted, and due to the respective play of each one of the connecting bolts, respectively relative to one or the other of the coupling flanges. In the event of a failure, whereby one or two of the four bolts have failed, and/or the flexible disk itself has failed, the overall flexible coupling will remain operable in a fail-safe operating mode. In this condition, the force or torque transmission is carried out directly from one coupling flange to the other coupling flange through the remaining bolts therebetween. A slight relative rotation of the coupling flanges will cause the free-playing ends of the respective bolts to engage or bear against the respective flanges to which they are not securely fastened, to achieve a direct torque transmitting connection from one coupling flange through the bolts to the other coupling flange, while the free-playing contact between the free ends of the bolts and the flanges still allows the required flexibility. While this fail-safe operating mode will not be as smooth in operation, and will suffer relatively rapid wear, as compared to the normal operating condition, it will allow safe operation of the shaft drive system until the failed coupling can be repaired or replaced.

According to a preferred particular embodiment of the invention, a total of four bolt connections are provided, whereby two first bolts are secured without play to the first coupling flange and arranged with play relative to the second coupling flange, and two second bolts are secured without play to the second coupling flange and arranged with play relative to the first coupling flange. Preferably, three bushing members are arranged on each connecting bolt to achieve the above described rigid clamping of the flexible disk and one of the coupling flanges on the one hand, as well as the free play between the bolt and the other coupling flange on the other hand. For example, a first bushing member with a protruding rim or lip clamps the first coupling flange tightly against the bolt head, a second bushing member with a protruding rim or lip clamps the flexible disk tightly against the first bushing member, and a third bushing member with a protruding rim or lip braces against the threaded nut and transmits the clamping force applied by the nut through the second bushing member to the flexible disk, the third bushing member, and the first coupling flange. The second coupling flange is received with play around the second and third bushing members and respectively between the protruding rims or lips of the second and third bushing members.

The flexible coupling according to the invention can be used in any application in which it is necessary to couple two shafts, but is particularly suitable for use in transmission systems for driving the flaps and slats on a wing of an aircraft. The invention provides an improved system in this regard.

The invention achieves the advantage that the two coupling flanges and the flexible disk arranged therebetween to provide the flexible connection form an integral structural component with a very simple, yet robust structure and arrangement. This integrated structural component meets all the strength and safety requirements prescribed in the manufacture and operation of aircraft. Moreover, the present flexible coupling combines the functions of a simple shaft coupling and of a flexible articulated joint, whereby the interruptions in the shaft line can be displaced more toward the end of the shaft line. For this reason it is possible to use fewer longer shaft sections, with fewer couplings, whereby weight and cost savings are achieved in the overall shaft transmission system.

BRIEF DESCRIPTION OF THE DRAWINGS

In order that the invention may be clearly understood, it will now be described in connection with an example embodiment, with reference to the drawings, wherein:

FIG. 3A is a sectional view taken along the line IIIA—IIIA in FIG. 2;

FIG. 3B is a sectional view taken along the line IIIB—IIIB in FIG. 2; and

DETAILED DESCRIPTION OF PREFERRED EXAMPLE EMBODIMENTS AND OF THE BEST MODE OF THE INVENTION

Figure 1:
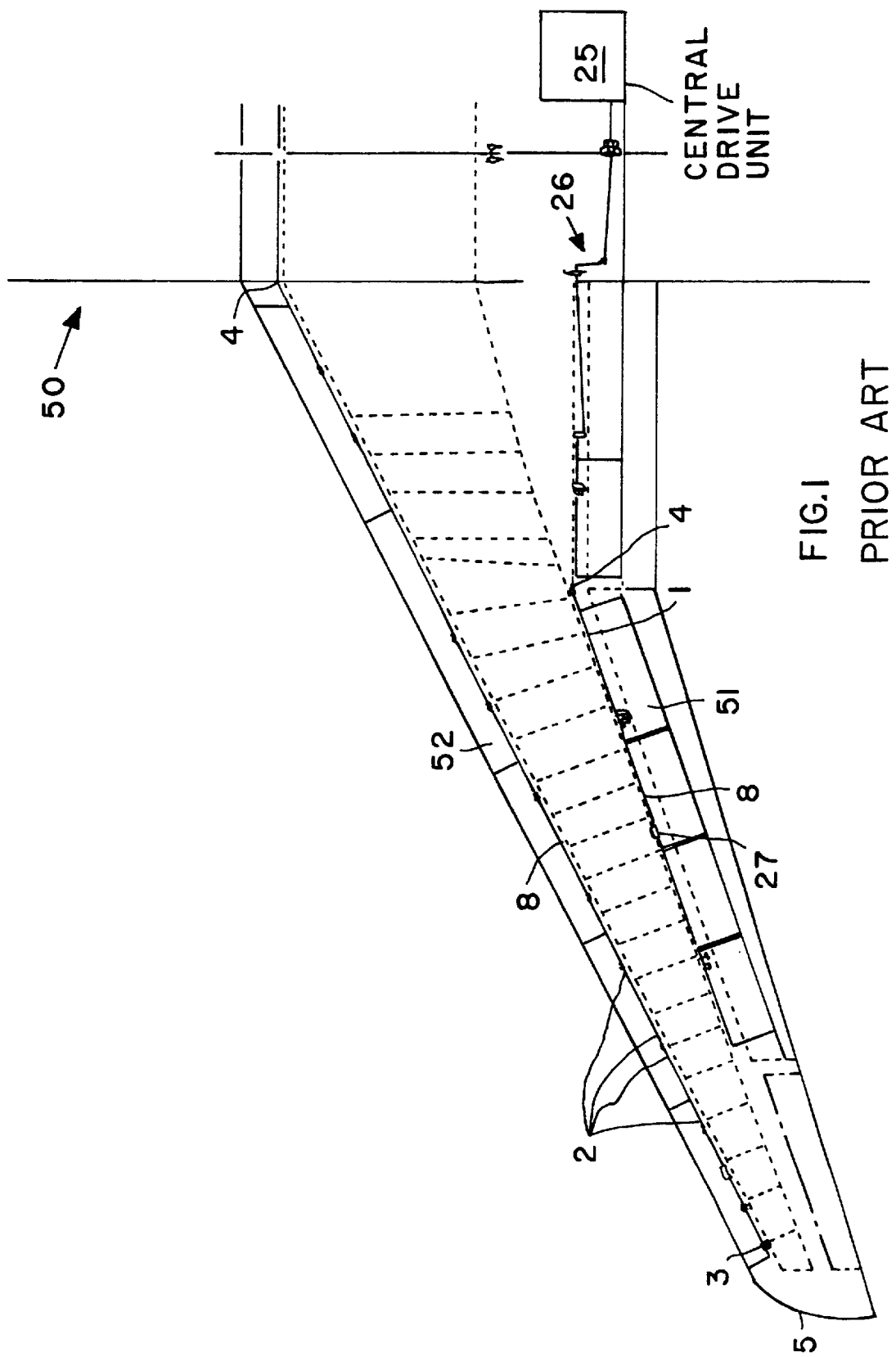
FIG. 1 is a schematic plan view of a transmission system transmitting power from a central drive unit to several flaps and slats in a wing of an aircraft, as is generally conventionally known.

The improved flexible coupling 2 according to the invention can be used in a generally known transmission system 1 as shown in FIG. 1 and discussed above. In this context, the transmission system 1 is used to drive or actuate the high lift flaps, which may include the landing flaps 51 and the high lift slats 52 provided on the wing 5. However, the present flexible coupling 2 can be used for coupling together any two shafts where flexibility of the coupling as well as a fail-safe operation are desired.

Figure 2:
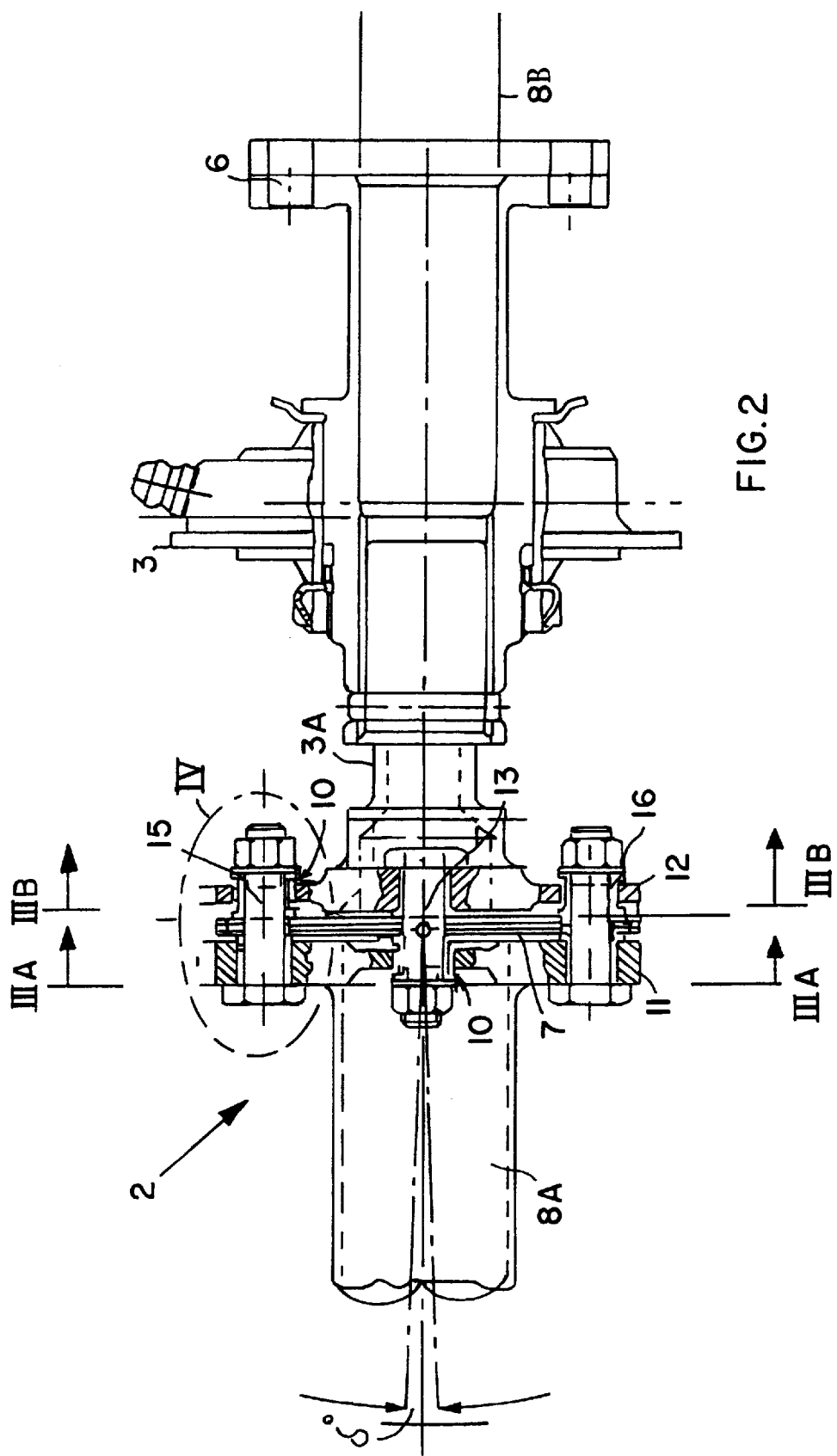
FIG. 2 is a schematic view, in partial section, of a relevant portion of a transmission system including a flexible coupling according to the invention interconnecting two drive shafts.

As shown more particularly in FIG. 2, the present flexible coupling 2 is interposed and connected together with a support bearing 3, between a first rotational transmission shaft 8A and a second rotational transmission shaft 8B, to provide a flexible yet positive torque-transmitting connection therebetween. The flexible coupling 2 comprises a first coupling flange 11 that is rigidly mounted or fixed on the first transmission shaft 8A, and a second coupling flange 12 that is rigidly mounted or fixed to the shaft stub 3A of the support bearing 3. The rigid mounting of the flanges on the shafts can be achieved by any know means, such as bolting, threading, welding, form-lock fitting, etc. The opposite end of the shaft stub 3A of the support bearing 3 is equipped with a further coupling flange 6, by which it is connected to the second transmission shaft 8B. The bearing 3 may be any conventional rotational bearing, including roller bearings, ball bearings or the like, with grease fittings and mounting brackets as required. As an alternative, the support bearing 3 may be omitted in certain situations, whereby the second coupling flange 12 would be directly secured to the second transmission shaft 8B. In this manner, the shafts 8A and 8B are connected together for power transmission from one to the other.

To provide the required flexibility, the flexible coupling 2 further comprises a flexible disk 7 arranged between the two flanges 11 and 12, which are arranged spaced apart and substantially parallel to each other, whereby the term "substantially parallel" is intended to allow for a deviation from perfect parallelism within the range of flexibility. The disk 7 may comprise a single flexible steel disk such as a spring steel disk, or may comprise a packet of plural steel disks or plates, with or without alternating rubber or elastomeric discs arranged therebetween. Alternatively, the flexible disk 7 may be made of a fiber-reinforced composite material arranged in several sandwiched layers.

The flexible disk 7 provides the flexible connection between the two flanges 11 and 12 as will now be described. A plurality of connector bolts, and preferably four connector bolts 13, 14, 15 and 16, respectively pass through four sets of aligned holes through the first flange 11, the flexible disk 7, and the second flange 12. The four bolts 13 to 16 include a first pair of bolts 15 and 16 that are rigidly secured without play relative to the first coupling flange 11, but are arranged with play relative to the second coupling flange 12. The four bolts further include a second pair of bolts 13 and 14 that are securely connected without play relative to the second coupling flange 12 while allowing play relative to the first coupling flange 11. Moreover, all of the bolts are securely clamped or fixed to the flexible disk 7. In this manner, the power or torque transmission is, in sequence, from the first coupling flange 11, through the first pair of bolts 15 and 16, through the flexible disk 7, through the second pair of bolts 13 and 14 and finally to the second coupling flange 12. Of course, the power or torque transmission can be in the opposite direction or sequence as well.

In this context, the flexible disk 7 is rigidly secured to the first coupling flange 11 at two radially opposite locations established by the first connector bolts 15 and 16, which lie on a vertical line in the illustration of FIGS. 3A and 3B. Furthermore, the flexible disk 7 is rigidly connected to the second coupling flange 12 at two radially or diametrically opposed locations established by the second connector bolts 13 and 14, which lie on a horizontal line in FIGS. 3A and 3B. Thus, the respective bolts are rotationally offset by 90° relative to one another.

With this connection, and since the first bolts 15 and 16 allow free play relative to the second coupling flange 12, while the second bolts 13 and 14 allow free play relative to the first coupling flange 11, the two flanges 11 and 12 may deviate flexibly out of parallel from each other (while maintaining the rotational connection through the flexible disk), and thus the coupling 2 provides a flexible connection between the first shaft 8A and the second shaft 8B.

The extent of flexibility of the coupling is represented by an angular range δ in which the axis of the first shaft 8A may deviate from the axis of the shaft stub 3A of the support bearing 3. The present flexible coupling 2 provides flexibility up to a certain angle δ. In this normal operating condition, the power or torque transmission is entirely through the flexible disk 7 between the two coupling flanges 11 and 12, and the free play of the connector bolts 13 to 16 relative to the respective coupling flanges 11 and 12 is maintained 60 that there is no contact and no force transmission between the first bolts 15 and 16 and the second flange 12 on the one hand, or between the second bolts 13 and 14 and the first flange 11 on the other hand.

However, in the event that the flexible disk 7 and/or one of the connector bolts 13, 14, 15 and 16 fractures, or suffers some other failure, then the connection and torque transmission through the flexible disk 7 will be disrupted. In this case, the flexible coupling 2 will continue to operate in a fail-safe mode as follows. Once the connection through the flexible disk 7 is disrupted, the two coupling flanges 11 and 12 will rotate slightly relative to one another, just to the point at which the free play or clearance between the respective free ends of the bolts 13, 14, 15 and 16 and the flanges 11 and 12 has been closed, such that the previously free ends of the bolts come to bear against the side wall of the respective clearance holes in the respective flanges.

In this condition, there will be a rotational force transmitting connection between the two coupling flanges 11 and 12 directly through the connector bolts 13, 14, 15 and 16. Since the free play of the clearance holes allows the connector bolts 13, 14, 15 and 16 to move back and forth, and to tilt or adjust their positions relative to the respective non-fixed coupling flange, the flexibility of the flexible coupling 2 is maintained even in the fail-safe operating mode. The rotational force transmission in this fail-safe operating mode may not be as smooth as in the normal operating mode, and the free ends of the bolts rubbing in the clearance holes will be subject to accelerated wear, but the shaft coupling will remain operable and carry out all its functions to avoid a breakdown of the transmission system and to allow the transmission system to be operated until a repair or replacement of the flexible coupling 2 can be carried out.

The details of a preferred embodiment of the interconnection among the two coupling flanges 11 and 12 and the flexible disk 7 by means of the connecting bolts 13, 14, 15 and 16 will now be described in connection with FIGS. 3A, 3B and 4. FIG. 3A is a sectional view taken along the line IIIA—IIIA in FIG. 2, showing the first coupling flange 11 in an end or plan view. As seen in FIG. 3A, the plan shape of the first flange 11 is preferably a curve-edged, modified square having four respective concavely curved sides or edges extending respectively between four convexly curved corners or points. The convexly curved corners form respective flange lugs 18, whereby an opposite pair of the lugs 18 has close fitting holes 19A therein, and a second opposite pair of the lugs has clearance holes 19B therein. The connector bolts 13, 14, 15 and 16 are respectively received in bushings 17 and pass through the holes 19A, 19B of the flange lugs 18, whereby the clearance holes 19B provide a free play clearance gap 10 around the bushings 17 of the second pair of bolts 13 and 14, while the first connector bolts 15 and 16 are received with their bushings 17 without play in the fitting holes 19A and 19B.

FIG. 3B shows a sectional view taken along the line IIIB—IIIB in FIG. 2, whereby the second coupling flange 12 is seen in an end or plan view. It is apparent that the structure, configuration and arrangement of the second flange 12 is generally similar to that of the first flange 11, whereby the second flange 12 also includes flange lugs 18 with fitting holes 19A and clearance holes 19B respectively bored therethrough. The difference relative to the first flange 11 shown in FIG. 3A, is that the second flange 12 has the clearance holes 19B with the free play clearance gap 10 around the bushings 17 of the first set of connector bolts 15 and 16, while the fitting holes 19A receive the second set of connector bolts 13 and 14 with their bushings 17 without any play.

Thus, FIGS. 3A and 3B are intended to show how the first set of bolts 15 and 16 are securely fixed relative to the first flange 11, but arranged with free play relative to the second flange 12, while the second bolts 13 and 14 are securely fixed relative to the second flange 12, but with free play relative to the first flange 11. Furthermore, each one of the bolts 13, 14, 15 and 16 is securely clamped or fixed to the flexible disk 7 in a manner that will now be described with reference to FIG. 4.

Figure 4:
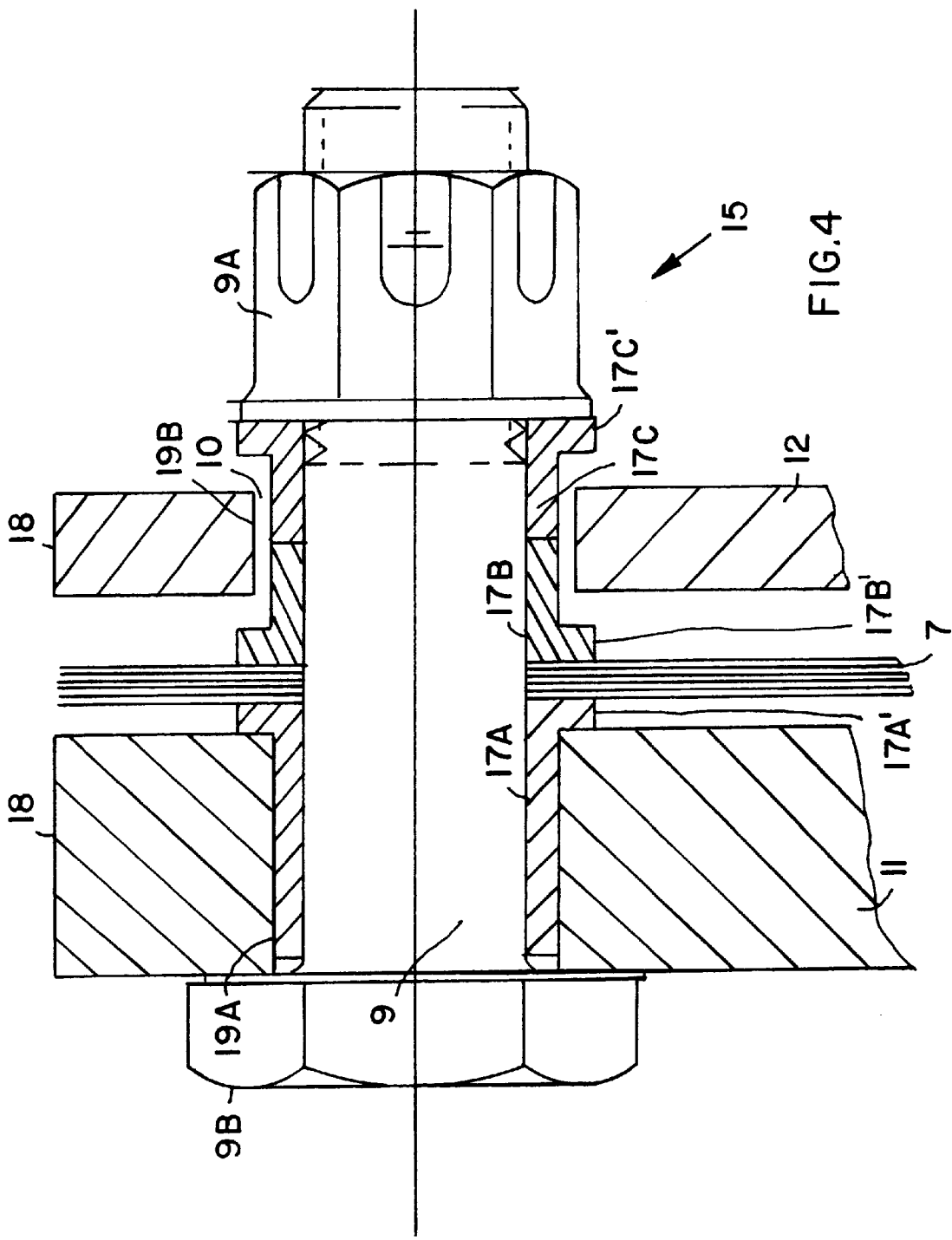
FIG. 4 is an enlarged detail view, shown partially in section, of the detail area IV in FIG. 2.

FIG. 4 shows a single one of the bolt connections, provided by the connector bolt 15 in this example, while it should be understood that each one of the bolt connections is carried out in a similar manner, whereby two of the bolt connections are simply reversed in direction. As shown in FIG. 4, the connector bolt 15 includes a bolt having a bolt shaft 9 with a bolt head 9B and a threaded nut 9A threaded onto the free end of the bolt shaft 9. As already described, the flange lug 18 of the first coupling flange 11 has a fitting hole 19A therein, while the flange lug 18 of the second coupling flange 12 has a clearance hole 19B therein.

The bolt connection is assembled with a three-part bushing 17 arranged on the bolt shaft 9. A first bushing member 17A having a protruding lip or rim 17A' is arranged on the bolt shaft 9 to receive the first coupling flange 11 between its protruding rim 17A' and the bolt head 9B. Then, the flexible disk 7 is arranged on the bolt shaft 9, followed by a second bushing member 17B with a protruding rim or lip 17B', such that the flexible disk 7 is sandwiched between the protruding rims 17A' and 17B' of the first and second bushing members 17A and 17B. Next, the second coupling flange 12 is arranged over the bolt shaft 9, followed by a third bushing member 17C having a protruding lip or rim 17C', such that the second coupling flange 12 is received with play between the protruding rims 17B' and 17C' of the second and third bushing members 17B and 17C. Namely, the clearance hole 19B in the second coupling flange 12 is large enough to provide a radial free play clearance gap 10 around the outer diameter of the second and third bushing members 17B and 17C, and the dimensions of the bushing members are such that there is an axial play between the second coupling flange 12 and the respective protruding rims 17B' and 17C'.

With this bushing arrangement, the clamping force provided by the bolt connection 15, i.e. the clamping force exerted by the threaded nut 9A relative to the bolt head 9B, is positively transmitted through the bushing members to forcefully clamp and hold the flexible disk 7 relative to the first coupling flange 11, and to securely fasten the bolt 15 to the first coupling flange 11. On the other hand, the free end of the bolt, i.e. the end with the nut 9A in this example, remains completely free and unconnected to the second coupling flange 12.

FIG. 4 shows that the flexible disk 7 may be pre-flexed out of a flat plane. Namely, the disk 7 is shown closer to the first flange 11 at the locations of the bolts 15 and 16, and it is similarly understood that the disk 7 is closer to the second flange 12 at the locations of the bolts 13 and 14. As a result, the disk 7 has a wavy cup shape, which enhances the flexible coupling effect.

The configuration of the bushing members described above and shown in FIG. 4 is not mandatory. Alternatively, for example, the second and third bushing members 17B and 17C may be formed as a single integral part, omitting one or both of the protruding rims 17B' and/or 17C', as long as the bushing member has a diameter that overlaps onto the flexible disk 7 to provide the necessary clamping force, while fitting through the clearance hole 19B. Washers could also be used instead of, or in addition to, the bushings, which could then be simple bushing sleeves. The bushing members could alternatively be entirely omitted, with the nut bearing directly against the flexible disk if the clearance hole 19B is large enough to allow a clearance around the nut.

The orientation of any or all of the bolts can of course be reversed, so that the bolt head 9B is arranged at the free play end, while the nut 9A is arranged at the securely fixed end. In this manner, by reversing two of the bolts, it is possible to achieve an arrangement in which all the bolts are oriented in the same direction, i.e. with all four nuts on the same side of the coupling, for easy assembly access and the like. In further alternative embodiments, the bolts can be replaced by other connector members, comprising any known fasteners, such as studs, pins, rivets and the like, which are respectively securely fastened to one of the coupling flanges, for example by welding or riveting, and arranged with free play in a clearance hole relative to the other coupling flange.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A flexible coupling arrangement for flexibly coupling two shafts, comprising:
    a first shaft;
    a first coupling flange secured to an end of said first shaft;
    a second shaft;
    a second coupling flange secured to an end of said second shaft and arranged substantially parallel to and spaced apart from said first coupling flange;
    a flexible disk arranged between said first and second coupling flanges;
    at least one first connector member securely fastened to and interconnecting said first coupling flange and said flexible disk; and
    at least one second connector member securely fastened to and interconnecting said second coupling flange and said flexible disk;
    wherein:
    said second connector member passes with free play through a first clearance hole provided in said first coupling flange;
    said first connector member passes with free play through a second clearance hole provided in said second coupling flange;
    each said connector member comprises a respective bolt including a bolt shaft, a bolt head at one end of said bolt shaft, and a nut threaded onto said bolt shaft;
    said bolt shaft of said first connector member passes through respective first holes in said first coupling flange and said flexible disk, and said nut and said bolt head of said first connector member receive and apply a clamping force to said first coupling flange and said flexible disk therebetween;
    said bolt shaft of said second connector member passes through respective second holes in said second coupling flange and said flexible disk, and said nut and said bolt head of said second connector member receive and apply a clamping force to said second coupling flange and said flexible disk therebetween;
    each said connector member further comprises a respective bushing arranged on said bolt shaft;
    each said bushing respectively comprises a first bushing member, and separate second and third bushing members;
    said separate second and third bushing members of said first connector member are arranged on opposite sides of said second coupling flange and each include an axially extending bushing sleeve and a rim protruding radially from said bushing sleeve;
    said first bushing member of said first connector member comprises an axially extending bushing sleeve arranged around said bolt shaft within said first hole in said first coupling flange, and a rim protruding radially from said bushing sleeve between said first coupling flange and said flexible disk;
    said separate second and third bushing members of said second connector member are arranged on opposite sides of said first coupling flange and each include an axially extending bushing sleeve and a rim protruding radially from said bushing sleeve; and
    said first bushing member of said second connector member comprises an axially extending bushing sleeve arranged around said bolt shaft within said second hole in said second coupling flange, and a rim protruding radially from said bushing sleeve between said second coupling flange and said flexible disk.

2. The flexible coupling arrangement according to claim 1,
    wherein said flexible disk forms a primary torque-transmitting flexible connection between said first and second coupling flanges in a normal operating mode when said flexible coupling arrangement is intact,
    wherein said first connector member makes no contact with said second coupling flange, and said second connector member makes no contact with said first coupling flange, in said normal operating mode,
    wherein said first connector member is so arranged and adapted to contact and engage said second coupling flange in said second clearance hole and said second connector member is so arranged and adapted to contact and engage said first coupling flange in said first clearance hole so as to form an auxiliary torque-transmitting connection between said first and second coupling flanges in a fail-safe operating mode when said primary torque-transmitting flexible connection has failed, and wherein movable play of said connector members respectively in said clearance holes provides flexibility of said auxiliary torque-transmitting connection in said fail-safe operating mode.

3. The flexible coupling arrangement according to claim 1, comprising two of said first connector members arranged diametrically opposite each other relative to a rotation axis of said first coupling flange, and two of said second connector members arranged diametrically opposite each other relative to a rotation axis of said second coupling flange and rotationally offset from said first connector members respectively by 90°.

4. The flexible coupling arrangement according to claim 1, wherein said first holes and said second holes are respective fitting holes in which said respective connector members are received without play.

5. The flexible coupling arrangement according to claim 1,
wherein said rim of said first bushing member of said first connector member is arranged between and spacing apart said first coupling flange and said flexible disk, and said axially extending bushing sleeves of said second and third bushing members of said first connector member are arranged between said flexible disk and said bolt head or said nut of said first connector member and pass through said second clearance hole in said second coupling flange with play, and
wherein said rim of said first bushing member of said second connector member is arranged between and spacing apart said second coupling flange and said flexible disk, and said axially extending bushing sleeves of said second and third bushing members of said second connector member are arranged between said flexible disk and said bolt head or said nut of said second connector member and pass through said first clearance hole in said first coupling flange with play.

6. The flexible coupling arrangement according to claim 1,
wherein said first connector member is arranged with said bolt head thereof adjacent said first coupling flange and said nut thereof adjacent said second coupling flange, and
wherein said second connector member is arranged with said bolt head thereof adjacent said second coupling flange and said nut thereof adjacent said first coupling flange.

7. The flexible coupling arrangement according to claim 1, comprising two of said first connector members arranged diametrically opposite each other relative to a rotation axis of said first coupling flange, and two of said second connector members arranged diametrically opposite each other relative to a rotation axis of said second coupling flange and rotationally offset from said first connector members respectively by 90°.

8. The flexible coupling arrangement according to claim 1, wherein said flexible disk is connected to said first coupling flange only at at least one point respectively established by said at least one first connector member, and said flexible disk is connected to said second coupling flange only at at least one point respectively established by said at least one second connector element.

9. The flexible coupling arrangement according to claim 1, wherein said first and second coupling flanges are respective rigid plates.

10. The flexible coupling arrangement according to claim 1, wherein said first and second coupling flanges each have a respective plan shape comprising four convexly curved protruding lugs with four concavely curved edges respectively therebetween, with two of said clearance holes provided in a first diametrically opposed pair of said lugs and two fitting holes for receiving said connector members provided in a second diametrically opposed pair of said lugs.

11. The flexible coupling arrangement according to claim 1, wherein said flexible disk comprises a disk-shaped plate of flexible steel.

12. The flexible coupling arrangement according to claim 1, being so arranged and adapted to flexibly couple said first and second shafts so as to allow said first and second shafts to relatively deviate from axial alignment in an angular range.

13. The flexible coupling arrangement according to claim 1, further comprising a support bearing including a bearing stub shaft, wherein said bearing stub shaft is said second shaft having said second coupling plate on an end thereof, and further comprising a third shaft connected to an opposite end of said bearing stub shaft.

14. The flexible coupling arrangement according to claim 1, further in combination with a central drive unit, an actuator, and a high lift flap in an aircraft, wherein said flexible coupling arrangement is arranged in a wing of said aircraft, and said first shaft is connected at least indirectly to said central drive unit, and said second shaft is connected via said actuator to said high lift flap.

15. The flexible coupling arrangement according to claim 1,
wherein said rims of said second and third bushing members of said first connector member protrude radially and outwardly from said bushing sleeve beyond a radial dimension of said second clearance hole in said second coupling flange so as to retain said second coupling flange with play between said rims; and
wherein said rims of said second and third bushing members of said second connector member protrude radially and outwardly from said bushing sleeve beyond a radial dimension of said first clearance hole in said first coupling flange so as to retain said first coupling flange with play between said rims.

16. In an aircraft including a fuselage, a wing connected to said fuselage, a high lift flap provided on said wing, an actuator adapted to move said flap among selected positions, a central drive unit, and a drive shaft system connecting said central drive unit to said actuator for power transmission thereto,
an improved flexible coupling arrangement for flexibly coupling first and second shafts of said drive shaft system, wherein said improved flexible coupling arrangement comprises:
a first coupling flange secured to an end of said first shaft;
a second coupling flange secured to an end of said second shaft and positioned substantially parallel to and spaced apart from said first coupling flange;
a flexible disk arranged between said first and second coupling flanges;
at least one first connector member securely fastened to and interconnecting said first coupling flange and said flexible disk; and
at least one second connector member securely fastened to and interconnecting said second coupling flange and said flexible disk;
wherein:
said second connector member passes with free play through a first clearance hole provided in said first coupling flange;

said first connector member passes with free play through a second clearance hole provided in said second coupling flange;

each said connector member comprises a respective bolt including a bolt shaft, a bolt head at one end of said bolt shaft, and a nut threaded onto said bolt shaft;

said bolt shaft of said first connector member passes through respective first holes in said first coupling flange and said flexible disk, and said nut and said bolt head of said first connector member receive and apply a clamping force to said first coupling flange and said flexible disk therebetween;

said bolt shaft of said second connector member passes through respective second holes in said second coupling flange and said flexible disk, and said nut and said bolt head of said second connector member receive and apply a clamping force to said second coupling flange and said flexible disk therebetween;

each said connector member further comprises a respective bushing arranged on said bolt shaft;

each said bushing respectively comprises a first bushing member, and separate second and third bushing members;

said separate second and third bushing members of said first connector member are arranged on opposite sides of said second coupling flange and each include an axially extending bushing sleeve and a rim protruding radially from said bushing sleeve;

said first bushing member of said first connector member comprises an axially extending bushing sleeve arranged around said bolt shaft within said first hole in said first coupling flange, and a rim protruding radially from said bushing sleeve between said first coupling flange and said flexible disk;

said separate second and third bushing members of said second connector member are arranged on opposite sides of said first coupling flange and each include an axially extending bushing sleeve and a rim protruding radially from said bushing sleeve; and said first bushing member of said second connector member comprises an axially extending bushing sleeve arranged around said bolt shaft within said second hole in said second coupling flange, and a rim protruding radially from said bushing sleeve between said second coupling flange and said flexible disk.

17. The improved flexible coupling arrangement in the aircraft according to claim 16, wherein said rim of said first bushing member of said first connector member is arranged between and spacing apart said first coupling flange and said flexible disk, and said axially extending bushing sleeves of said second and third bushing members of said first connector member are arranged between said flexible disk and said bolt head or said nut of said first connector member and pass through said second clearance hole in said second coupling flange with play, and wherein said rim of said first bushing member of said second connector member is arranged between and spacing apart said second coupling flange and said flexible disk, and said axially extending bushing sleeves of said second and third bushing members of said second connector member are arranged between said flexible disk and said bolt head or said nut of said second connector member and pass through said first clearance hole in said first coupling flange with play.

18. The improved flexible coupling arrangement in the aircraft according to claim 16, comprising two of said first connector members arranged diametrically opposite each other relative to a rotation axis of said first coupling flange, and two of said second connector members arranged diametrically opposite each other relative to a rotation axis of said second coupling flange and rotationally offset from said first connector members respectively by 90°.

* * * * *